United States Patent
Ling et al.

(10) Patent No.: US 10,596,594 B2
(45) Date of Patent: Mar. 24, 2020

(54) VIBRATION MOTOR

(71) Applicant: AAC Technologies Pte, Ltd., Singapore (SG)

(72) Inventors: Fanghua Ling, Shenzhen (CN); Hongfu Xu, Shenzhen (CN); Wenli Wang, Shenzhen (CN); Xifeng Huang, Shenzhen (CN)

(73) Assignee: AAC Technologies Pte. Ltd., Singapore (SG)

( * ) Notice: Subject to any disclaimer, the term of this patent is extended or adjusted under 35 U.S.C. 154(b) by 382 days.

(21) Appl. No.: 15/651,313

(22) Filed: Jul. 17, 2017

(65) Prior Publication Data
US 2018/0297066 A1    Oct. 18, 2018

(30) Foreign Application Priority Data
Apr. 14, 2017 (CN) .................... 2017 2 0398018 U

(51) Int. Cl.
  *B06B 1/04* (2006.01)
  *H02K 33/02* (2006.01)
  *H02K 33/00* (2006.01)
  *H02K 5/04* (2006.01)

(52) U.S. Cl.
  CPC ............ *B06B 1/045* (2013.01); *H02K 33/00* (2013.01); *H02K 33/02* (2013.01); *H02K 5/04* (2013.01)

(58) Field of Classification Search
  CPC .......... B06B 1/045; B06B 1/04; H02K 33/00; H02K 33/16; H02K 33/02; H02K 35/00; H02K 35/02
  See application file for complete search history.

(56) References Cited

U.S. PATENT DOCUMENTS

| | | | | |
|---|---|---|---|---|
| 8,253,282 B2 * | 8/2012 | Park | ....................... | H02K 33/16 310/25 |
| 8,648,502 B2 * | 2/2014 | Park | ....................... | H02K 33/16 310/15 |
| 8,766,494 B2 * | 7/2014 | Park | ....................... | H02K 35/02 310/25 |
| 9,024,489 B2 * | 5/2015 | Akanuma | .............. | H02K 33/16 310/15 |
| 9,306,429 B2 * | 4/2016 | Akanuma | ................ | H02K 5/24 |
| 9,312,744 B2 * | 4/2016 | Akanuma | .............. | H02K 33/00 |
| 9,774,236 B2 * | 9/2017 | Xu | ......................... | H02K 33/16 |
| 9,871,432 B2 * | 1/2018 | Mao | ....................... | H02K 33/16 |
| 10,008,894 B2 * | 6/2018 | Mao | ........................ | H02K 1/34 |

(Continued)

*Primary Examiner* — Edgardo San Martin
(74) *Attorney, Agent, or Firm* — IPro, PLLC; Na Xu

(57) ABSTRACT

The present disclosure provides a vibration motor. The vibration motor includes a housing with side walls; a vibration unit accommodated in the housing; a driving device; and an elastic member elastically supporting the vibration unit in the housing. The vibration unit includes a first surface and a second surface connecting the first surface. The elastic member includes a first fixed section, extension sections extending from two sides of the first fixed section and surrounding the second surface and a second fixed section connecting to the extension section and fixed on the side wall away from one side of the first fixed section. The elastic member includes a first elastic member and a second elastic member opposite to the first elastic member. The first elastic member and the second elastic member are respectively fixed on two first surfaces of the vibration unit.

12 Claims, 2 Drawing Sheets

(56) References Cited

U.S. PATENT DOCUMENTS

| | | | |
|---|---|---|---|
| 10,170,967 B2* | 1/2019 | Chai | H02K 33/00 |
| 10,220,412 B2* | 3/2019 | Mao | B06B 1/045 |
| 10,236,761 B2* | 3/2019 | Wang | H02K 33/16 |
| 10,307,791 B2* | 6/2019 | Xu | B06B 1/045 |
| 10,328,461 B2* | 6/2019 | Xu | B06B 1/045 |
| 2012/0169148 A1* | 7/2012 | Kim | H02K 33/16 310/25 |
| 2013/0229070 A1* | 9/2013 | Akanuma | H02K 33/00 310/25 |
| 2017/0117788 A1* | 4/2017 | Hou | H02K 1/34 |
| 2018/0297061 A1* | 10/2018 | Mao | B06B 1/045 |
| 2018/0297063 A1* | 10/2018 | Mao | B06B 1/045 |
| 2018/0297064 A1* | 10/2018 | Mao | B06B 1/045 |
| 2018/0297070 A1* | 10/2018 | Xu | H02K 33/16 |
| 2018/0297071 A1* | 10/2018 | Xu | H02K 33/16 |
| 2018/0297077 A1* | 10/2018 | Chai | B06B 1/045 |

\* cited by examiner

VIBRATION MOTOR

FIELD OF THE PRESENT DISCLOSURE

The present disclosure relates to vibration motors, more particularly to a vibration motor having a vibration unit vibrating along a horizontal direction.

DESCRIPTION OF RELATED ART

With the development of electronic technologies, portable consumable electronic products are increasingly popular, such as mobile phone, handheld game console, navigation device or handheld multimedia entertainment equipment, in which a vibration motor is generally used for system feedback, such as call reminder, message reminder, navigation reminder of mobile phone, vibration feedback of game console. To meet the demand of such a wide application, the vibration motor shall have high performance and long life.

The vibration motor usually comprises a housing with accommodating space, a vibration unit accommodated in the accommodating space, and an elastic member connecting the housing and the vibration unit respectively. The elastic member supports the vibration unit to move reciprocally inside the housing to produce vibration. The elastic member of the art is usually two springs provided around the vibration unit on both sides of the vibration unit, which have its middle position welded on the housing and two ends extending to the opposite side of the vibration unit respectively and fixed together with the vibration unit, however, in installation of such structure, the welding tooling of the second spring shall pass through the first spring, thus usually requiring to provide an envision hole for welding on the spring, which is complex to operate and hard to process.

Therefore it is necessary to provide an improved vibration motor for overcoming the above-mentioned disadvantages.

BRIEF DESCRIPTION OF THE DRAWING

Many aspects of the exemplary embodiment can be better understood with reference to the following drawing. The components in the drawing are not necessarily drawn to scale, the emphasis instead being placed upon clearly illustrating the principles of the present disclosure.

DETAILED DESCRIPTION OF THE EXEMPLARY EMBODIMENT

The present disclosure will hereinafter be described in detail with reference to an exemplary embodiment. To make the technical problems to be solved, technical solutions and beneficial effects of the present disclosure more apparent, the present disclosure is described in further detail together with the figure and the embodiment. It should be understood the specific embodiment described hereby is only to explain the disclosure, not intended to limit the disclosure.

Figure 1:
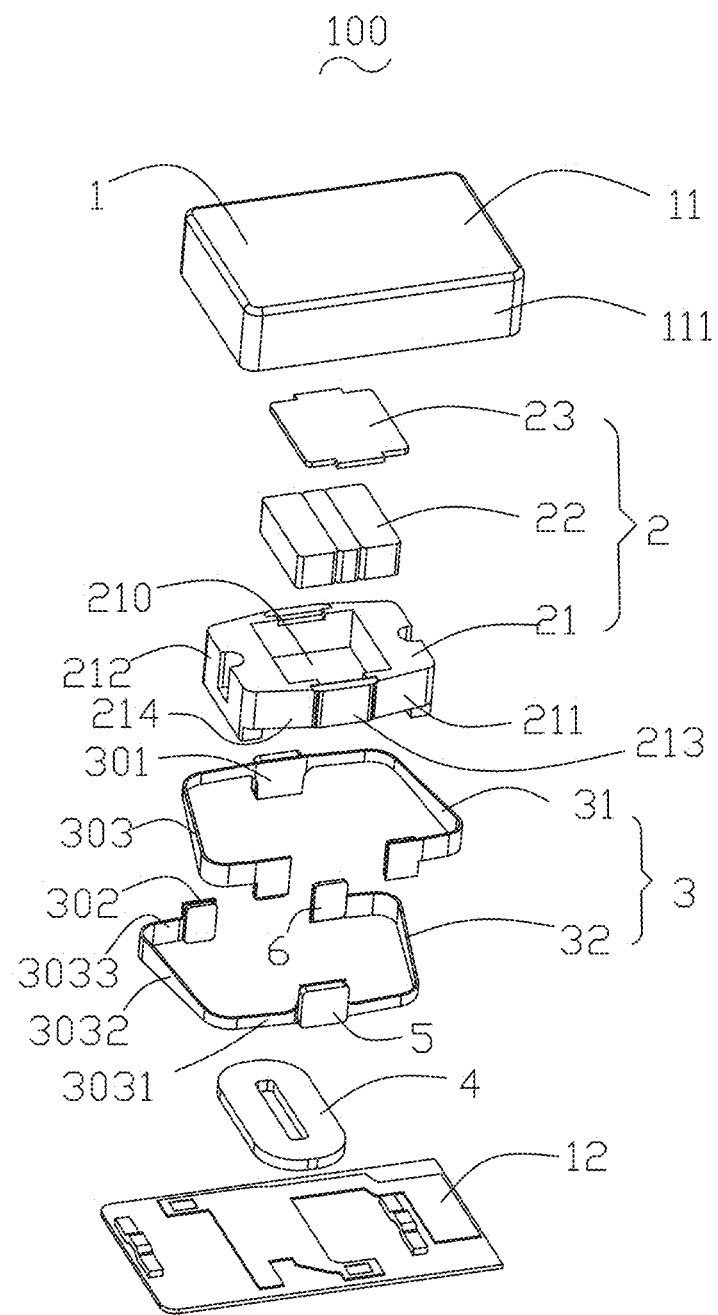
FIG. 1 is an exploded view of a vibration motor in accordance with an exemplary embodiment of the present disclosure.
Figure 2:
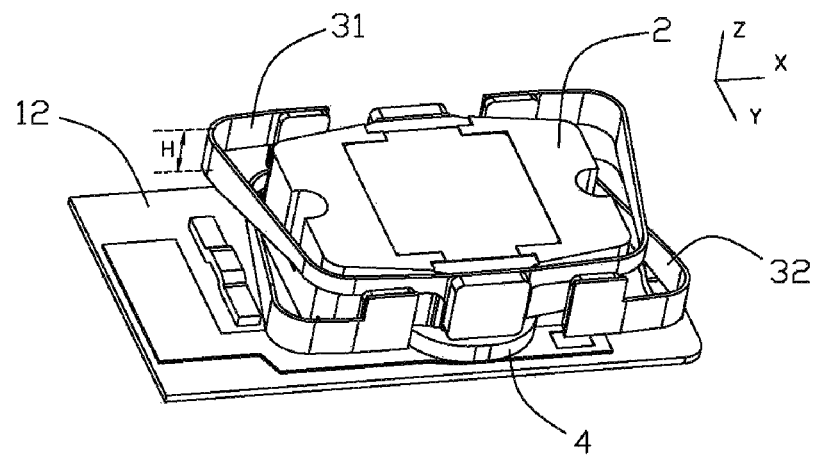
FIG. 2 is an exploded view of a part of the vibration motor in FIG. 1.

Referring to FIGS. 1-2, a vibration motor 100 in accordance with an exemplary embodiment of the present disclosure comprises a housing 1, an vibration unit 2 accommodated in the housing 1, an elastic member 3 elastically supporting the vibration unit 2, and a driving device 4 driving the vibration unit 2 to vibrate.

The housing 1 comprises a cover plate 11 with a side wall 111 and a bottom plate 12 connecting to the cover plate 11, and forms an accommodating space. The driving device 4 is fixed on the bottom plate 12, and the elastic member 3 is fixed on the side wall 111 of the cover plate 11. In this embodiment, the driving device 4 is a coil.

The vibration unit 2 comprises a weight 21 and a magnet 22 provided on the weight 21. Specifically, a through hole 210 is provided in the weight 21, and the through hole 210 penetrates through the weight 21 along a direction perpendicular to a vibration direction of the vibration unit 2. The magnet 22 is positioned in the through hole 210. The magnet 22 is arranged to be opposite to the coil. The cooperation between the magnet and the coil drives the vibration unit 2 to vibrate along a direction parallel to the bottom plate 12.

The magnet 22 may be a piece of permanent magnet or a combination of multiple permanent magnets, specifically in this embodiment, the magnet 22 comprises three permanent magnets located in the through hole 210. Further, the vibration unit 2 comprises a magnetic conductive piece 23 provided on the weight 21 and the magnet 22 for increasing magnetic induction strength.

The weight 21 comprises a first surface 211 and a second surface 212 opposite to the side wall 111, wherein the first surface 211 is provided along the vibration direction of the vibration unit 2, the second surface 212 is perpendicular to the vibration direction of the vibration unit 2.

Figure 3:
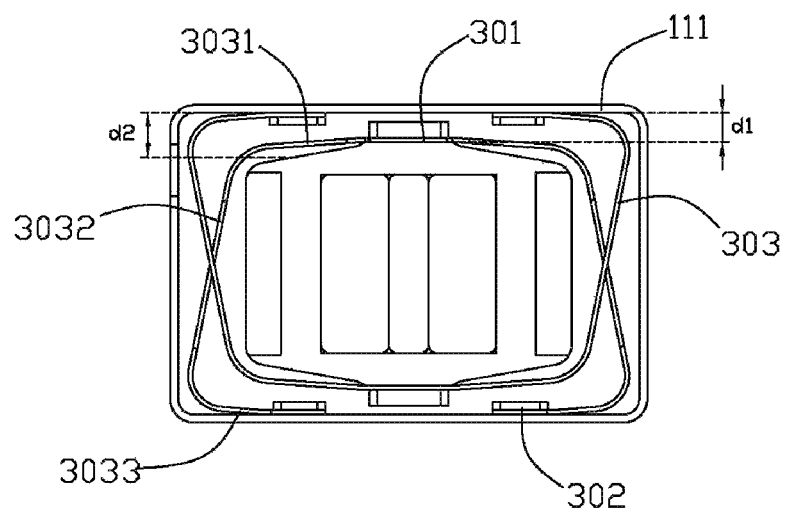
FIG. 3 is an assembled view of a vibration unit and a housing of the vibration motor in FIG. 1.

Referring to FIG. 3, the elastic member 3 comprises a first elastic member 31 and a second elastic member 32 opposite to the first elastic member 31. The first elastic member 31 has a same structure as that of the second elastic member 32, each comprising a first fixed section 301, a second fixed section 302 and an extension 303. The first fixed section 301 is fixed on the first surface 211 of the weight. The second fixed section 302 is fixed on the side wall 111 on the side far away from the first fixed section 301. The extension section 303 is connected with the first fixed section 301 and the second fixed section 302, surrounding the second surface 212 and provided spaced from the second surface 212.

The first fixed sections 301 of the first elastic member 31 and the second elastic member 32 are fixed on the two first surface 211 on both sides of the vibration unit 2, the extension sections 303 of the first elastic member 31 and the second elastic member 32 are provided across each other. The bending and extension directions of the first elastic member 31 and the second elastic member 32 are opposite to each other. And on the side wall 111, a distance between the two second fixed sections 302 is greater than a width of the first fixed section 301, so as to avoid collision between the second fixed section 302 and the vibration unit.

In this embodiment, the extension section 303 comprises two first extension sections 3031 extending from the first fixed section 301 to both sides respectively, two second extension sections 3032 extending from the first extension section 3031 in a bending way and provided spaced from the second surface 212, and two third extension sections 3033 extending from the second extension section 3032 toward the side wall 111.

Further, a fixed step 213 is provided on the first surface 211 protruding toward the side wall 111 and matches the first fixed section 301. The first fixed section 301 is fixed on the fixed step 213. Specifically in this embodiment, it is fixed by welding. The second fixed section 302 is also fixed on the side wall 111 of the housing 1 by welding.

Further, an avoiding section 214 is provided on both sides of the fixed step 213, respectively, and is concave away from the side wall to avoid the first extension section and the third extension for avoiding the collision between the elastic section 3 and the vibration unit 2 during vibration. Referring to FIGS. 1-3, the fixed step 213 is spaced apart from the side wall 111 adjacent to the fixed step by a first distance d1, the avoiding section 214 is spaced apart from the side wall 111 by a second distance d2, and the first distance d1 is less than the second distance d2. Referring to FIGS. 1-2, each of the elastic members 31-32 has a width H in the direction perpendicular to the vibration direction, and the width H increases from the first extension section 3031 to the third extension section 3033. The coordinate system XYZ is shown in FIG. 2, in which "X" refers to the vibration direction of the vibration unit, "Y" refers to the direction perpendicular to X and parallel to the bottom plate 12, and "Z", perpendicular to X, refers to the thickness direction of the vibration motor 100, i.e., the width direction of the elastic member.

Furthermore, a first buffer piece 5 is provided on the first fixed section 301, a second buffer piece 6 is provided on the second fixed section 302. Wherein, the first buffer piece 5 is provided on one side of the first fixed section 301 opposite to the side wall 111 to prevent the collision between the first fixed section and the sidewall, the second buffer piece 6 is provided on one side of the second fixed section 302 opposite to the vibration unit 2 to prevent the collision between the elastic member and the vibration unit or among the elastic members.

In the assembly process of the vibration unit, firstly the first fixed section 301 of the two elastic members 3 are welded with the two fixed steps 213 of the weight 21 respectively, then the second fixed section 302 is welded on the corresponding side wall 111, thereby the position to be welded is unblock, thus avoiding the defect that it's required to pass through one mounted spring to do welding tooling after the one elastic member is mounted. It is easy for operation and can be fixed firmly with improved vibration performance of products.

The present disclosure provides a new vibration motor with the first fixed part of the first elastic member and the second elastic member fixed on the two first surfaces on the two sides of the vibration unit respectively, without mutual distraction and shield in installation, thus facilitating the installation of vibration unit and elastic member, easy for operation and can be fixed firmly with high reliability.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. A vibration motor comprising:
a housing with side walls and a bottom plate connecting to the side walls;
a vibration unit accommodated in the housing, the vibration unit including a first surface opposite to the side wall and extending along a vibration direction of the vibration unit, and a second surface connecting the first surface;
a driving device fixed on the bottom plate;
an elastic member elastically supporting the vibration unit in the housing, the elastic member including a first fixed section, extension sections extending from two sides of the first fixed section and surrounding the second surface and a second fixed section connecting to the extension section and fixed on the side wall away from one side of the first fixed section; wherein
the elastic member comprises a first elastic member and a second elastic member opposite to the first elastic member; the first elastic member and the second elastic member are respectively fixed on two first surfaces of the vibration unit; wherein the second elastic member is disposed underneath the first elastic member in a direction perpendicular to the vibration direction and located between the first elastic member and the bottom plate, and orthographic projections of the first elastic member and the second elastic member on the bottom plate are crossed.

2. The vibration motor as described in claim 1, wherein the extension section comprises two first extension sections extending from two sides of the first fixed section, two second extension sections obliquely extending from the two first extension sections and keeping a distance from the second surface, and two third extension sections obliquely extending from the second extension sections toward the side wall, the third extension sections connect with the two second fixed sections respectively.

3. The vibration motor as described in claim 2, wherein a distance between the two second fixed sections is greater than a width of the first fixed section.

4. The vibration motor as described in claim 2, wherein the vibration unit comprises a weight with a through hole and a magnet located in the through hole, the driving device is a coil provided opposite to the magnet, the first surface and the second surface are located on the weight.

5. The vibration motor as described in claim 4, wherein a fixed step matching the first fixed section is arranged on the first surface.

6. The vibration motor as described in claim 5, wherein an avoiding section is provided on both sides of the fixed step, and is concave away from the side wall for avoiding the first extension section and the third extension.

7. The vibration motor as described in claim 5, wherein the first fixed section is fixed together with the fixed step by welding.

8. The vibration motor as described in claim 7, wherein the second fixed section is fixed together with the side wall by welding.

9. The vibration motor as described in claim 4, wherein a first buffer piece is provided on one side of the first fixed section opposite to the side wall.

10. The vibration motor as described in claim 4, wherein a second buffer piece is provided on one side of the second fixed section opposite to the vibration unit.

11. The vibration motor as described in claim 6, wherein the fixed step is spaced apart from the side wall adjacent to the first surface by a first distance, the avoiding section is spaced apart from the side wall by a second distance, and the first distance is less than the second distance.

12. The vibration motor as described in claim 2, wherein each of the elastic members has a width in the direction perpendicular to the vibration direction, and the width increases from the first extension section to the third extension section.

* * * * *